(12) United States Patent
Albrecht et al.

(10) Patent No.: US 6,288,876 B1
(45) Date of Patent: Sep. 11, 2001

(54) MELTING AND REFREEZING METHOD FOR SMOTHING AND LOAD/UNLOADING LIFT TAB FOR DISK DRIVE SMOOTHED LIFT TAB AND GIMBAL ASSEMBLY AND DATA STORAGE DEVICE INCORPORATING SMOOTHED LIFT TAB

(75) Inventors: Thomas Robert Albrecht, San Jose; William Joseph Kozlovsky, Sunnyvale; Gurinder Pal Singh, San Jose; Mike Suk, Milpitas, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/293,672

(22) Filed: Apr. 16, 1999

(51) Int. Cl.$^7$ .................................................. G11B 5/54
(52) U.S. Cl. .................. 360/245.3; 360/255; 360/255.5; 360/255.9
(58) Field of Search ................... 360/245.3, 245.7, 360/245, 254.6, 255, 255.5, 255.9

(56) References Cited

U.S. PATENT DOCUMENTS

| | | | |
|---|---|---|---|
| 5,232,674 | * 8/1993 | Mukai | 423/173 |
| 5,237,472 | 8/1993 | Morehouse et al. | 360/105 |
| 5,341,260 | 8/1994 | Jabbari | 360/105 |
| 5,572,387 | 11/1996 | Brooks, Jr. et al. | 360/104 |
| 5,585,990 | 12/1996 | Boutaghou | 360/105 |
| 6,043,352 | * 3/2000 | Bestenlehrer | 219/121.62 |
| 6,103,315 | * 8/2000 | Gray | 427/454 |

\* cited by examiner

*Primary Examiner*—A. J. Heinz
(74) *Attorney, Agent, or Firm*—Lumen Intellectual Property Services

(57) ABSTRACT

A lift tab for a load/unload type of data storage hard drive and a method of smoothing the lift tab. The method includes the step of striking the lift tab with short duration (e.g. 10–500 nanosecond) energy pulses to melt a thin surface layer of the lift tab. The melted layer flows under surface tension forces, smoothing out bumps and scratches. The melted layer quickly refreezes, forming an exceptionally smooth melted and refrozen spot. Preferably, the melted and refrozen spot is 0.2–10 microns deep. More preferably, the melted and refrozen spot is in the range of 1.0 to 3.0 microns thick. The lift tab can have a large number of melted and refrozen spots. The size of the melted and refrozen spots is practically limited by power available from energy sources such as lasers. Preferably, the melted and refrozen spots are at least several tens of microns in diameter. The present invention includes lift tabs having melted and refrozen spots. Also, the present invention includes head gimbal assemblies and hard drives having lift tabs with melted and refrozen spots.

24 Claims, 5 Drawing Sheets

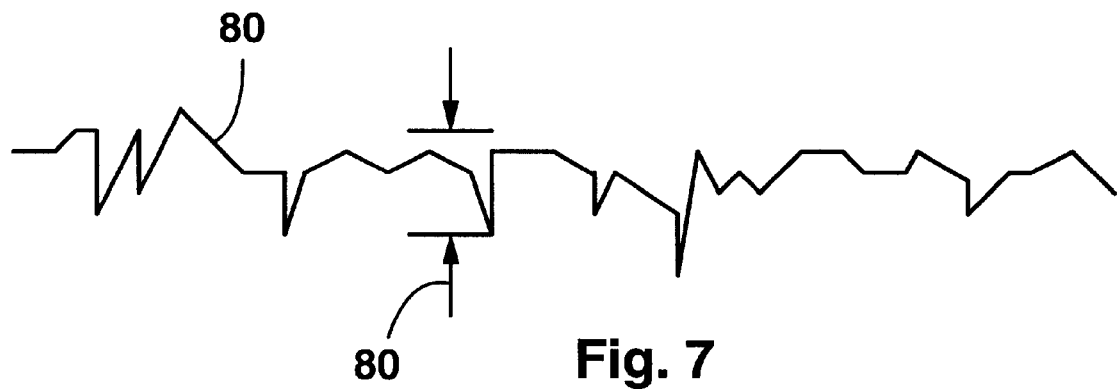
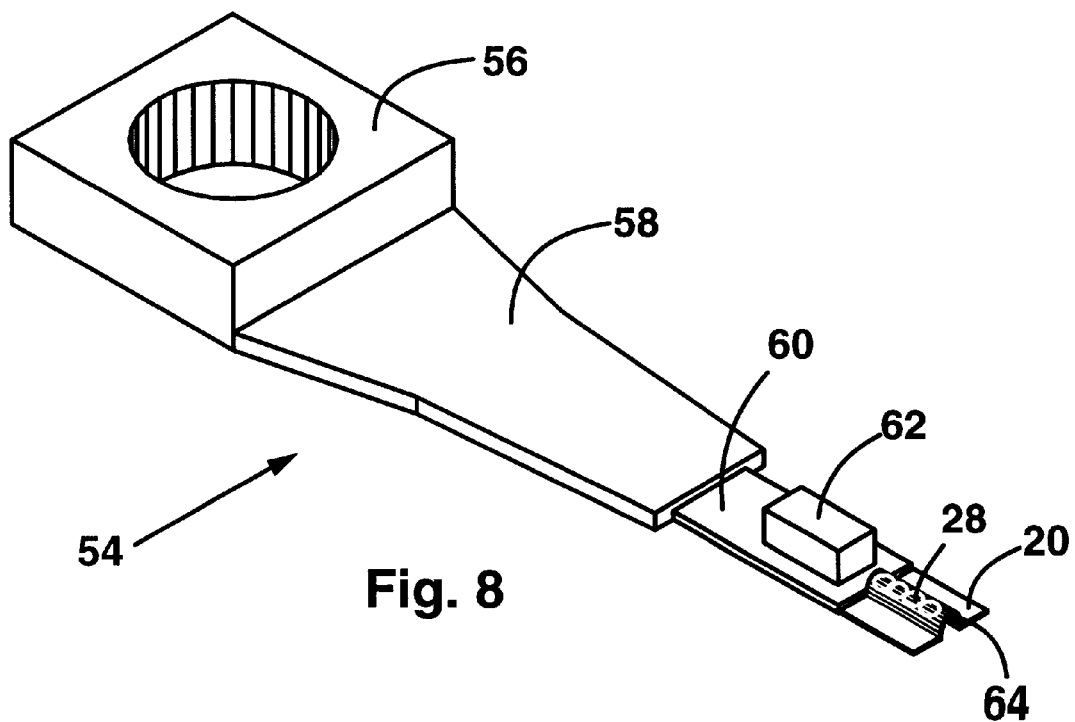

MELTING AND REFREEZING METHOD FOR SMOTHING AND LOAD/UNLOADING LIFT TAB FOR DISK DRIVE SMOOTHED LIFT TAB AND GIMBAL ASSEMBLY AND DATA STORAGE DEVICE INCORPORATING SMOOTHED LIFT TAB

FIELD OF THE INVENTION

The present invention relates to a method for smoothing load/unload lift tabs, and to load/unload lift tabs smoothed by the method. The lift tab of a head gimbal assembly functions to interact with a load/unload ramp to lift read/write heads from the disk surface.

BACKGROUND OF THE INVENTION

Computer hard drives typically employ a number of rapidly rotating disks having a coating of magnetic data storage material. Each disk is matched with a magnetic read/write head that is held very close to the disk surface. The magnetic read/write head can read and write data on the magnetic disk as it moves.

Some hard drives have disks with nonstick portions that will not cause damage to the magnetic heads if the heads rest on the nonstick portion for an extended period of time. Such hard drives are known as contact start/stop (CSS) hard drives. A CSS hard drive does not require a lift tab or load/unload ramp.

The magnetic head is prevented from contacting the disk surface by a cushion of air moving with the disk. Typically, the magnetic head is about 0.02 microns away from the disk while the disk is moving.

The need for very small spacing between the head and disk during the operation of the drive requires that the head and disk surfaces be very smooth. In non-CSS hard drives it is important for the magnetic head and disk surface not to come in contact when the disks are not rotating (i.e., when the hard drive is not powered). If a disk and magnetic head are at rest and in contact for a period of time, the head and disk surface can stick together, resulting in damage to the disk surface when the disks start to rotate. In some cases the stiction force can prevent the disks from rotating altogether. Also, the disk must start from rest, and a certain minimum velocity is required for the magnetic head to float over the disk surface. Therefore, each startup of the hard drive can result in the magnetic head and disk surface rubbing for a distance until the disk achieves sufficient speed to form the air cushion.

For these reasons, load/unload ramp structures have been used in some hard drives to hold the magnetic heads away from the disk surfaces while the hard drive is not operating. The magnetic heads are released from the ramp structure when the disks have achieved the minimum speed for causing the magnetic heads to float above the disk surfaces. CSS hard drives do not have load/unload ramp structures or lift tabs.

FIG. 1 (prior art) shows a typical prior art load/unload type hard drive with three disks 2. An actuator arm 3 supports a suspension 4, a slider 5 and a lift tab 6. A magnetic read/write head (not shown) is located on a bottom surface of the slider 5. The suspension 4 and slider 5 together comprise a head gimbal assembly. The actuator arm 3 pivots about a pivot post 9. The lift tab 6 is positioned on the suspension 4 so that it engages a ramp 8 on a ramp structure 10. The ramp 8 imparts an upward force on the lift tab 6 which lifts the slider 5 and magnetic head away from the disk 2. The magnetic head is thereby not in contact with the disk 2 whenever the lift tab 6 is moved onto the ramp 8. In order for the lift tab 6 to lift the slider from the disk, the lift tab 6 must rub against the ramp 8.

Although not shown in FIG. 1, the hard drive has additional arms, suspensions and sliders so that there is at least one suspension and slider for each disk surface.

FIG. 2 (prior art) shows a closeup side view of a lift tab 6 engaging the ramp 8. Shown are three different positions for the lift tab 6. A rounded bottom surface 12 of the lift tab 6 must rub against the ramp 8 in order for the slider to be lifted from the disk 2. The slider 5 is unloaded from the disk as the lift tab moves from left to right, and loaded onto the disk 2 as the lift tab moves from right to left.

Typically, the ramp structure 10 is made from low-friction polymer materials. Low friction ramps 8 reduce the amount of energy required to unload the magnetic heads (a concern during unpowered unloading).

Lift tabs are typically made of metal such as stainless steel. Since they are harder than the ramp structure (made of plastic), the lift tab may abrade the ramp during loading and unloading. Abrasion creates contaminate particles within the hard drive that can damage the sensitive slider/disk interface. It is therefore necessary for the bottom lift tab surface (which contacts the ramp) to be as smooth as possible. A smooth lift tab surface produces fewer particles when rubbed over the surface of the ramp.

Of particular concern are lift tabs stamped from sheet metal. This is because the process for making sheet metal, and the stamping process, produce relatively rough surfaces.

One method used in certain IBM products to smooth the lift tab is to press the lift tab against a very smooth and hard die. This 'coining' process smoothes the surface by closing cracks in the lift tab surface and planarizing protrusions. Smoothness is limited by the surface quality of the die and the pressure used. Lift tabs smoothed by the coining process still produce rather large numbers of particles when rubbed against a ramp.

There exists a need in the art for improved methods of smoothing the lift tab. Such a method would provide for reduced particulate contamination inside a data storage hard drive, leading to higher reliability.

OBJECTS AND ADVANTAGES OF THE INVENTION

Accordingly, it is a primary object of the present invention to provide a lift tab for head gimbal assemblies in a non-CSS hard drive that:

1) has a very smooth surface for contacting a ramp structure;

2) produces fewer particles when rubbed against a ramp structure compared to prior art lift tabs.

It is also a primary object of the present invention to provide a method for smoothing a lift tab for a non-CSS hard drive that:

1) produces very smooth lift tab surfaces;
2) is relatively inexpensive;
3) is scalable for volume production of smooth lift tabs;
4) is compatible with a wide variety of lift tab structures and shapes;
5) can be used on stainless steel lift tabs.

These and other objects and advantages will be apparent upon reading the following description and accompanying drawings.

SUMMARY OF THE INVENTION

These objects and advantages are attained by a method of smoothing a surface of a lift tab having surface roughness features of a characteristic depth (e.g. a peak to valley height or crack depth). The method includes the step of heating the lift tab surface with an energy pulse. The energy pulse has a power density (Megawatts/cm$^2$) sufficient to cause melting of the lift tab surface. The energy pulse strikes the surface for a duration sufficient such that the lift tab surface is melted to a depth greater than the characteristic depth. Also, the surface is melted to a depth less than 10 microns. After the surface is melted, the surface is allowed to cool, forming a very smooth melted and refrozen spot. The energy pulse is preferably a laser beam. The laser beam can be from a Q-switched laser or the like. The energy pulse can also be from a CW (continuous wave) laser or other continuous energy source which is scanned across the lift tab surface. Also, other kinds of pulsed energy sources can be used.

Preferably, the energy pulse has a power density in the range of 50–150 megawatts/cm$^2$. The energy pulse can strike the surface for a duration in the range of 10–500 nanoseconds, more preferably in the range of 150–250 nanoseconds. Preferably, the surface is melted to a depth in the range of 0.2 to 10 microns, more preferably in the range of 1.0 to 3.0 microns.

The present invention also includes lift tabs smoothed according to the method of the present invention.

The present invention further includes a lift tab having a curved surface for contacting a load/unload ramp, with an area of the curved surface smoothed by melting and refreezing. The melted and refrozen area may comprise several melted and refrozen spots. The melted and refrozen spots may be surrounded by ripples.

The present invention also includes a head gimbal assembly for use in a load/unload type of data storage hard drive. The head gimbal assembly has a mounting section for attachment to a rotary actuator, a rigid arm extending from the mounting section, a flexible suspension attached to the rigid arm, and a lift tab attached to the flexible suspension. The lift tab has a curved surface for contacting a load/unload ramp, and melted and refrozen spots on the curved surface.

DESCRIPTION OF THE FIGURES

FIG. 7 shows a closeup microscopic view of a lift tab surface before smoothing according to the present invention.

FIG. 8 shows a perspective view of a head gimbal assembly according to the present invention. The head gimbal assembly includes a lift tab smoothed according to the method of the present invention.

DETAILED DESCRIPTION

The present invention provides a method for smoothing lift tab surfaces so that fewer particles are created when the lift tab engages a ramp. Smoothing is accomplished by rapidly melting the surface of the lift tab. The melted area refreezes with a smooth surface finish. The energy required for melting is preferably provided by a pulsed laser beam, although other energy sources can also be used. The present invention also provides lift tabs smoothed according to the method of the present invention, as well as head gimbal assemblies and disk drives having lift tabs smoothed according to the method of the present invention.

Figure 1:
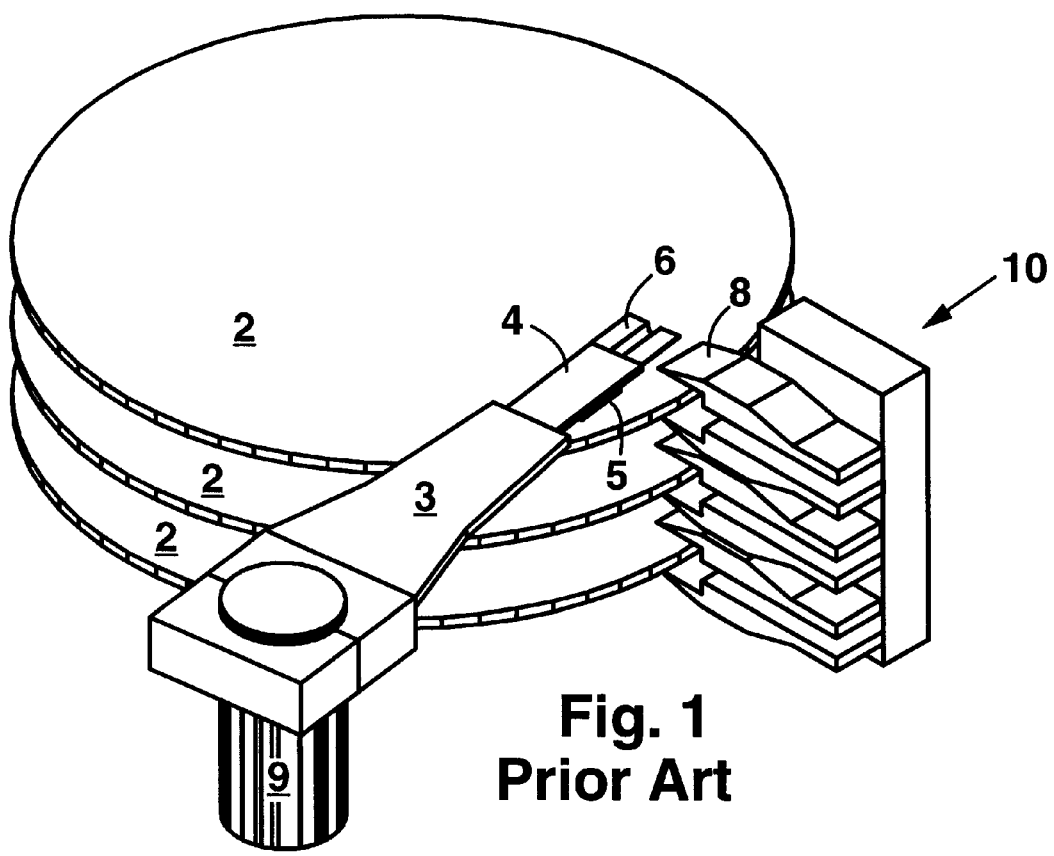
FIG. 1 (prior art) shows internal components of a data storage hard drive.
Figure 2:
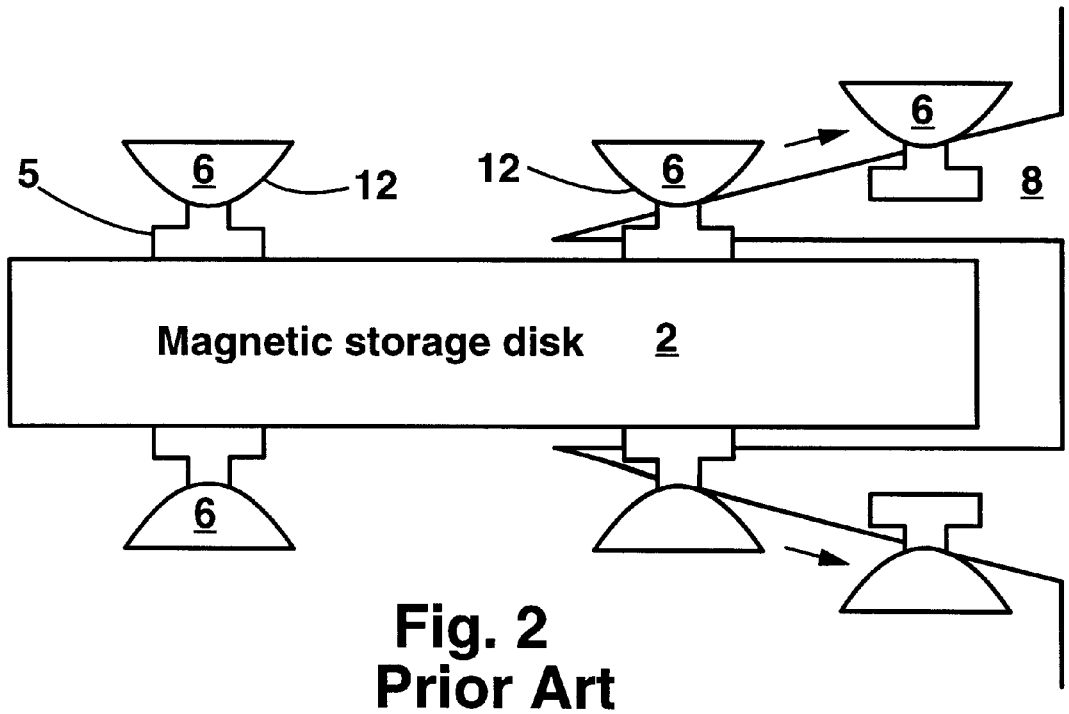
FIG. 2 (prior art) shows a closeup side view illustrating how a lift tab functions to lift a slider from a surface of a magnetic storage disk.
Figure 3:
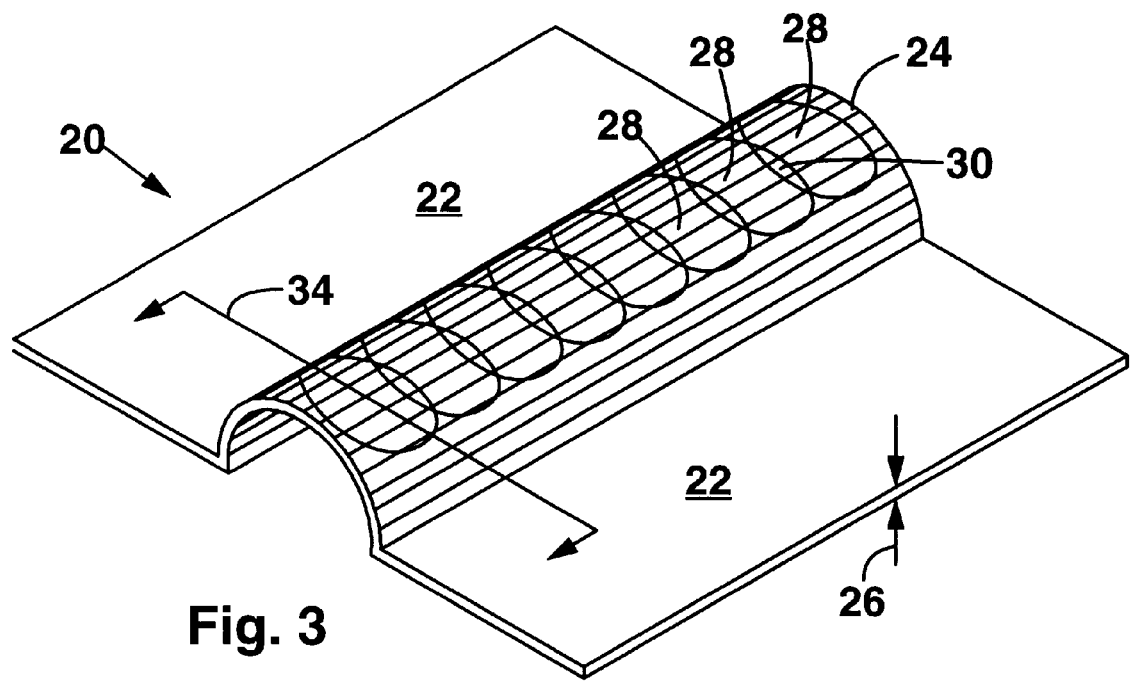
FIG. 3 shows a lift tab according to the present invention.

FIG. 3 shows a lift tab 20 smoothed according to the method of the present invention. The lift tab 20 has flat flanges 22 on either side of a cylindrical portion 24. The cylindrical portion 24 is the part of the lift tab 20 which engages a load/unload ramp (shown as ramp 8 of FIGS. 1 and 2) inside a hard drive. The present invention can also be used with lift tabs having other shapes. The lift tab 20 is made of stainless steel (e.g. 305 stainless), beryllium copper alloys, or spring steel or other suitable materials. The lift tab is produced by stamping a piece of sheet metal. The lift tab 20 may have a thickness 26 of about 20–100 microns, for example. The total size of the lift tab may be about 1 mm×2 mm. The cylindrical portion 24 may make a line contact, or point contact, or area contact with the load/unload ramp of a data storage hard drive.

The cylindrical portion 24 has melted and refrozen spots 28 (hereinafter referred to as melted spots) along its length. The melted spots 28 are smoother than the rest of the lift tab 20 (i.e. smoother than flanges 22, and smoother than regions of the cylindrical portion outside the spots 28). The melted spots 28 preferably overlap slightly in overlap regions 30. The amount of overlap can be, for example, about 10–20%. Each melted spot 28 has a boundary 32.

The size of the melted spots 28 may be about 70 by 300 microns, for example. The melted spots may be as small as 10 microns, or as large as 1000 microns or larger. The size of the melted spots depends upon the capabilities of the apparatus used to make the melted spots as well as the desired characteristics of the melted spots. The melted spots 28 may be circular, elliptical, or any other shape.

Figure 4:
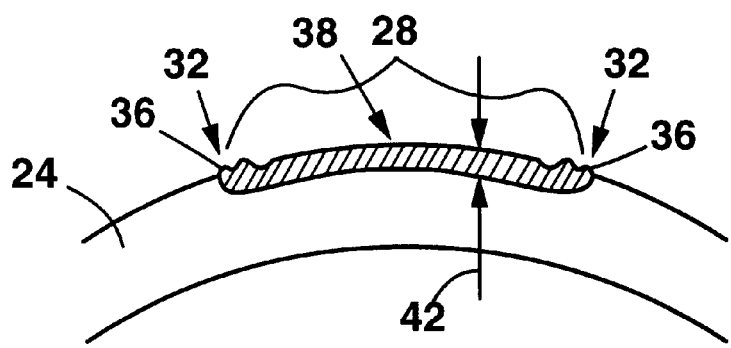
FIG. 4 shows a cross sectional side view of the lift tab of FIG. 1

FIG. 4 shows a cross sectional side view of a single melted spot 28 cut across line 34. The boundary 32 of each melted spot 28 may have small ripples 36 which circumscribe the melted spot 28. A central area 38 of each melted spot is exceptionally smooth. The ripples 36 are smaller where the melted spots overlap, and may even be unobservable in the overlap regions 30. Each melted spot 28 extends into the material a certain depth 42. The depth 42 of the melted spot indicates the volume of material which was melted in the smoothing process (the method of the present invention). Preferably, the depth 42 of the melted spot is in the range of about 0.2 to 10 microns. More preferably, the depth 42 is in the range of 1.0 to 3.0 microns. Depth 42 can be as deep as 10 microns.

The melted spot 28 is made of essentially the same material as the bulk of the lift tab 20. However, the melted spot has different physical characteristics due to the melting and refreezing process used to make the melted spot 28. The melted spot 28 has few, if any, cracks for example. The melting and refreezing process fills surface microcracks.

Also, the melted spot 28 may have a different crystal grain structure compared to the bulk of the lift tab 20. Further, the melted spot 28 has different contrast characteristics compared to the bulk of the lift tab 20 when viewed with a scanning electron microscope (SEM) or optical microscope.

Figure 5:
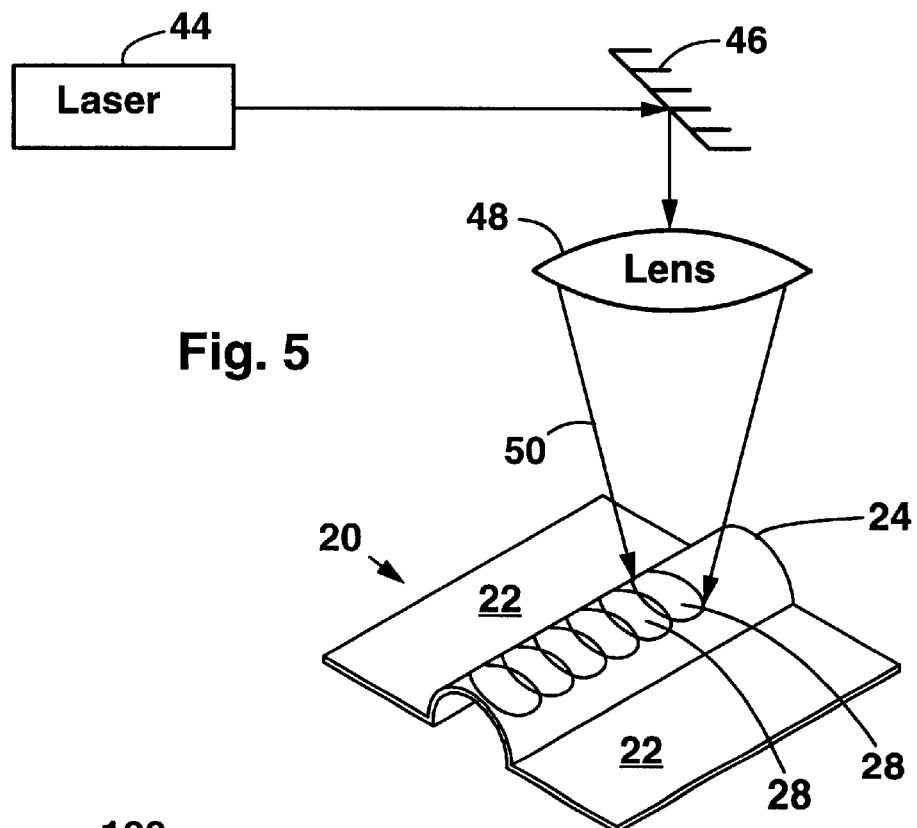
FIG. 5 shows an apparatus and method for smoothing a lift tab according to the method of the present invention.

FIG. 5 shows a preferred setup for making the melted spots 28 according to a method of the present invention. The setup has a laser 44, a scanning mirror 46 and a lens 48. The scanning mirror 46 directs a laser beam 50 to locations on the lift tab where smoothing is desired. The lens 48 focuses the laser beam 50 to a small spot which is scanned across the lift tab. The laser beam can be scanned in a zig-zag path across the lift tab if the area to be smoothed is large compared to laser spot size. The laser 44 is preferably a pulsed laser such as a pulsed singlemode or multimode Nd:YAG or Nd:YLF laser. According to the smoothing process of the present invention, the laser 44 produces pulses of energy which melt only a thin surface layer of the lift tab 20. The melted layer flows under surface tension forces, filling microcracks and smoothing irregularities in the surface. The melted layer quickly refreezes due to heat conduction through the tab, producing a very smooth surface. As the laser beam is scanned across the surface of the lift tab 20, many pulses can smooth relatively large regions (compared to an individual spot). Each laser pulse produces a single melted spot 28. The size of the melted spot 28 is determined by the focused spot size of the laser beam 50.

Preferably, the laser 44 produces light in the visible or ultraviolet because metals used for the lift tab generally have a higher absorption at these wavelengths. The Nd:YAG or Nd:YLF laser can be frequency doubled to 532 nm or 527 nm, for example. Optical fibers can also be used to direct the laser pulse toward the lift tab.

Although pulsed lasers are preferred for use in the present invention, the present invention includes using other energy sources such as electron beams, plasma jets, or focused flames. These sources may be CW or pulsed. If CW energy sources are used, then the source must be scanned over the lift tab surface. CW lasers can also be used.

The depth 42 of the melted spot 28 is determined by the duration of the energy pulses. Long duration energy pulses produce deep melted spots. Short duration pulses produce shallow melted spots. Very shallow melted spots (e.g. less than 0.5 microns) may not fill cracks and smooth irregularities which are larger than 0.5 microns. On the other hand, very deep melted spots (e.g. deeper than 5 microns) may produce excessive stress in the lift tab and cause warping. Of course, these limits on the melted spot depth depend upon the physical characteristics of the lift tab. A thick, sturdy lift tab with large surface roughness features will require deep melted spots for smoothing; a thin, fragile lift tab with shallow surface roughness features will require shallow melted spots. Therefore, for a given lift tab, there will exist an optimum range of depths for the melted spot. The depth of the melted spot is controllable by controlling the duration of the energy pulses, and to a lesser extent, by controlling the power density of the energy pulses.

As a specific example on stainless steel using 527 nm laser light, a 10 nanosecond energy pulse duration at about 130 Mw/cm$^2$ produces melted spots having melted depth of about 0.7 micron. A 200 nanosecond pulse duration at about 70 Mw/cm$^2$ produces melted spots having melted spot depth of about 2–3 microns.

Figure 6:
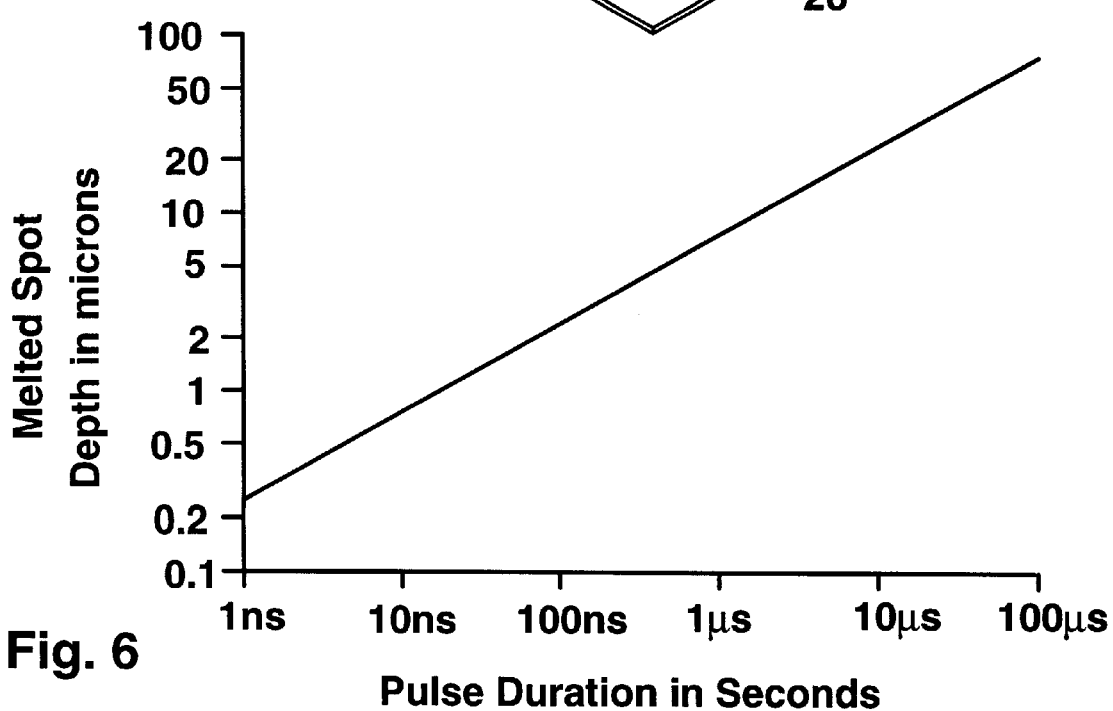
FIG. 6 is a theoretically calculated plot of laser pulse duration versus heat diffusion depth. Heat diffusion depth is closely related to melted spot depth. The plot illustrates that melted spot depth can be controlled by controlling the laser pulse duration. The plot also illustrates that the melted depth is proportional to the square root of pulse duration.

FIG. 6 shows a theoretical plot of heat diffusion depth versus energy pulse duration for melted spots produced on 305 stainless steel. The plot assumes a power density of about 100 Megawatts/cm$^2$ for the energy pulses. Heat diffusion depth is a close approximation of melted spot depth. Therefore, the plot of FIG. 6 provides information on how long the energy pulse duration should be for a desired melted spot depth in 305 stainless steel. The plot of FIG. 6 illustrates that melted spot depth can be controlled by adjusting the energy pulse duration. Different materials will have different relationships between melted spot depth and pulse length. For different materials, the slope of the plot can be different, for example. The theoretical plot illustrates that melted spot depth is approximately proportional to the square root of energy pulse duration.

In the present invention, energy pulses having a duration in the range of 10 ns to about 500 ns are generally preferred. This is because pulses within this duration range generally produce melted spots having a desired depth (e.g. generally in the range of 0.2 to 10 microns). More preferably, the energy pulses are in the range of 150 ns to 250 ns in duration. Energy pulses about 200 ns in duration produce melted spots about 2 microns deep in stainless steel. This is particularly preferred because many lift tabs have surface roughness features about 2 microns deep. A melted spot 2 microns deep will smooth such surface roughness features. Different pulse durations may be optimized for different materials, depending upon the desired melted spot depth and physical properties of the lift tab material.

FIG. 7 shows a microscopic close-up view of a lift tab surface 80 to be smoothed. The surface has roughness features with a characteristic depth 82. In the present invention, the characteristic depth is the peak-to-valley height of surface features, or the depth of surface microcracks. In the present invention, the lift tab is melted to a depth which is equal to or greater than the characteristic depth 82 of the surface roughness features. Therefore, the desired melted spot depth depends upon the roughness features of the lift tab surface. Preferably, the melted spot depth 42 is slightly greater than the characteristic depth 82 of the surface roughness features. Most generally, this is accomplished by melting the surface with an energy pulse having a duration sufficient to melt to at least the characteristic depth. The melted spot depth is controllable by adjusting the duration of the applied energy pulse. For example, if the characteristic depth 82 is 2 microns (a typical characteristic depth of surface roughness features on lift tabs), then a 200 ns energy pulse is appropriate as this will melt the surface to a depth of about 2 microns.

To reduce particle generation and wear of the load/unload ramp, it is important to eliminate sharp surface features of the lift tab. Sharp surface features produce large Hertzian stress in the load/unload ramp, and therefore produce undesired particles. Sharp surface features typically have length scales of less than about 50 microns. Long length scale features (e.g. longer than about 100 microns) and general waviness of the lift tab surface do not produce particles and therefore generally do not need to be smoothed. Therefore, in the present invention, it is important to smooth short length scale features. This is preferably accomplished by using energy pulses which melt an area having dimensions at least as large as the largest length scale features that can be tolerated. For example, if features with length scales smaller than about 50 microns are unacceptable, then the energy pulses used should melt an area of at least 50 microns across.

The power density of the energy pulses must be sufficient to cause the surface to melt, of course. In the present invention, the power density of each energy pulse (at the lift tab) is preferably about 100 Megawatts/cm$^2$. More generally, the power density can be in the range of about 50–150 Megawatts/cm$^2$. The power density required depends, of course, on the physical properties of the material comprising the lift tab. Relevant properties include the absorptivity at the wavelength used (if a laser is used), specific heat, melting temperature, and latent heat of melting, for example. The power density required also depends somewhat on the pulse duration. For example, if pulses about 300–500 ns are used, then the power density can be less than 50 Mw/cm$^2$ and melted spots are still produced. If pulses about 10–30 ns are used, then the power density may need to be in excess of 150 Mw to produce melted spots.

With all other factors being equal, the properties of high specific heat, high melting point, high latent heat of melting, and low thermal diffusivity tend to cause the melted spot to have a shallow depth in most cases.

When the energy pulse strikes the lift tab surface, melted material flows away from the melted spot due to thermal expansion. The melted material then refreezes rapidly due to fast heat diffusion. This creates roughness with a length scale comparable to the spot size (and ripples 36 shown in FIG. 4). Therefore, it is desirable in the present method for each melted spot 28 to be as large as practically possible. If each melted spot is small, then the ripples will dominate the surface and the surface will be relatively rough; if each melted spot is large, then ripples will cover a smaller fraction of the surface and the surface will be relatively smooth. Preferably the laser is focused to a spot having dimensions of at least several tens of microns.

The size of each melted spot 28 is only limited by the per-pulse energy capabilities of the energy pulses source (e.g., laser) used. If the energy pulse is spread over too large an area, then the power density will not be sufficient to cause melting. For example, it is anticipated that it would be ideal to smooth the entire cylindrical portion 24 with a single laser pulse, since this would eliminate any ripples from the cylindrical portion. However, a laser or other device capable of smoothing such a large area must produce exceptionally powerful energy pulses. Such a laser would be very large and very expensive and therefore would not be practical in a manufacturing setting.

A method for reducing the size of ripples is to focus the laser beam 50 such that the intensity distribution of the focused laser decreases gradually from center to periphery. In other words, so that the energy profile of the laser beam 50 does not have a definite boundary. This can be accomplished by using a CW-pumped, Q-switched laser.

In the method of the present invention, it is important to minimize the amount of heating of the lift tab 20. This is because excessive heating can cause warping of the lift tab. Heating can be limited by controlling the scanning speed and pulses repetition frequency so that the melted spots overlap only slightly (i.e. less than 20%). A small amount of overlap assures that most of the surface is hit with only a single laser pulse.

In a specific implementation of the present method, a multimode frequency doubled Nd:YLF (527 nm) laser is used. The pulse duration is 200 ns at a repetition rate of 100 Hz. The laser pulses are focused to a spot size of about 300 microns by 70 microns. The pulse energy incident on the lift tab is 2.8 millijoules per pulse. The laser beam is scanned across the lift tab at a rate of about 5 mm/sec. The scan direction is perpendicular to the long axis of the laser spot. These parameters produce slightly overlapping melted spots with very smooth surfaces.

FIG. 8 shows a head gimbal assembly 54 having the lift tab 20 smoothed according to the method of the present invention. The head gimbal assembly includes a mounting portion 56 for attachment to a rotary actuator (not shown) inside a data storage hard drive. A rigid arm 58 and flexible suspension 60 are attached to the mounting portion 56. The flexible suspension 60 supports a slider 62 which comprises a magnetic read/write head (not shown). The lift tab 20 is attached to the flexible suspension such that the lift tab can cause the flexible suspension to bend slightly when subject to a force. The lift tab has a smooth surface 64 which has been smoothed according to the method of the present invention (rapid melting and refreezing). The smooth surface 64 is the portion of the lift tab intended to contact a load/unload ramp. The smooth surface 64 has melted spots 28 formed by rapid heating and cooling. Preferably, the melted spots 28 have a depth in the range of 1.0 to 3.0 microns.

Figure 9:
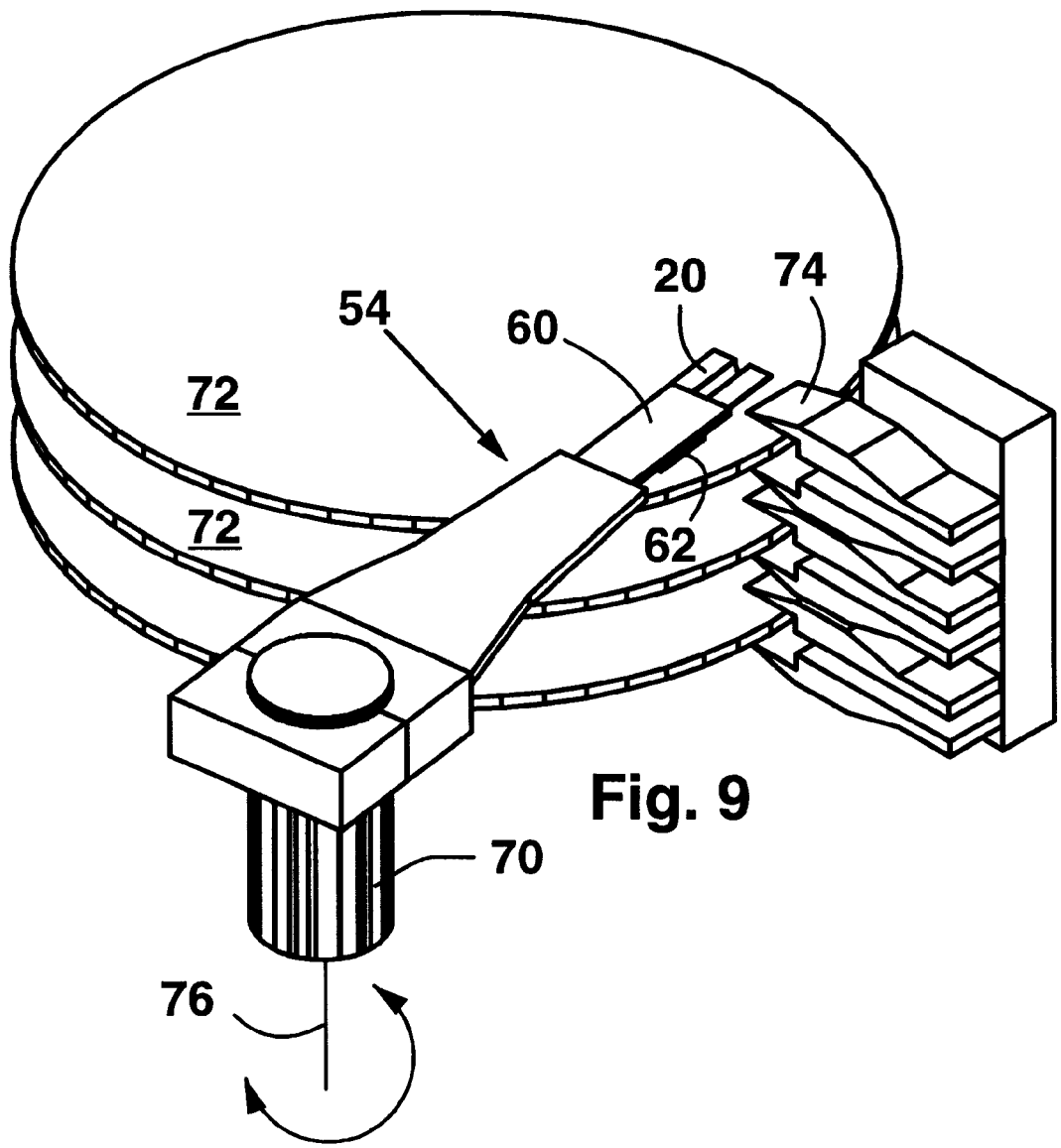
FIG. 9 shows a perspective view of a data storage hard drive according to the present invention. The hard drive includes a lift tab having melted and refrozen spots.

FIG. 9 shows internal components of a load/unload type of data storage hard drive according to the present invention. The drive has a rotary actuator 70. The head gimbal assembly 54 is attached to the rotary actuator 70. For clarity, only a single head gimbal assembly 54 is shown. The drive also has magnetic data storage disks 72 and a load/unload ramp 74. Magnetic disk 72 has surface with magnetically stored data which can be read by the slider 62. Load/unload ramp 74 provides for loading and unloading of slider 62 from magnetic disks 72. The rotary actuator 70 can rotate head gimbal assembly 54 about vertical axis 76. The head gimbal assembly is aligned so that lift tab 20 contacts ramp 74 when rotary actuator 70 rotates gimbal assembly 54 to its outermost position. The underside of the lift tab 20 has melted spots 28 (not visible in FIG. 8) which provide for abrasion-less rubbing of lift tab 20 against load/unload ramp 74.

Lift tabs smoothed according to the method of the present invention have exceptionally smooth surfaces and therefore do not produce particles when rubbed on a load/unload ramp. Lift tabs smoothed according to the present invention are particularly well suited for use with load/unload ramps made of polymer materials.

Although the method of the present invention has mainly been described as using a pulsed laser, any energy source which can melt the lift tab surface can be used. All that is required of the heat source is that it provide high energy for a short period of time to each point to be smoothed on the lift tab such that only a thin top layer (i.e. less than 10 microns thick) of the lift tab is melted. For example, it is possible to use a CW laser source where the CW beam is scanned over the lift tab surface at a high speed. In this way, a CW source can simulate a pulsed source (each point on the tab receives an energy pulse). CW or pulsed electron beams may also be used to produce the melted spots. Still further, pulsed or CW plasma jets, hot air jets, or flame torches can be used. If CW sources are used, they must be scanned over the surface of the lift tab at a sufficiently high velocity so that the lift tab is melted to a depth of less than 10 microns. The scanning velocity also depends, of course, on the area heated by the energy source. For example, an energy source which heats a large area must be scanned at a high velocity. An energy source which heats a small area can be scanned at a slower velocity.

It will be clear to one skilled in the art that the above embodiment may be altered in many ways without departing from the scope of the invention. Accordingly, the scope of the invention should be determined by the following claims and their legal equivalents.

What is claimed is:

1. A method for smoothing an area of a surface of a metal lift tab, wherein the lift tab has surface roughness features with a characteristic depth, the method comprising the step of:

a) heating the area with an energy pulse having a power density sufficient to cause melting of the lift tab surface, wherein the heating is performed for a duration sufficient to melt the lift tab to a depth greater than the characteristic depth of the surface roughness features, and wherein the area is melted to a depth of less than 10 microns;

b) cooling the area so that the area freezes.

2. The method of claim 1 wherein the energy pulses duration is in the range of 10–500 nanoseconds.

3. The method of claim 1 wherein the energy pulses duration is in the range of 150–250 nanoseconds.

4. The method of claim 1 wherein the area is melted to a depth greater than 0.2 microns.

5. The method of claim 1 wherein the area is melted to a depth in the range of 1.0 to 3 microns.

6. The method of claim 1 wherein the energy pulse is a laser light pulse.

7. The method of claim 6 wherein the laser light pulse is from a Q-switched, CW-pumped, frequency doubled Nd:YAG or Nd:YLF laser.

8. The method of claim 1 wherein the energy pulse is provided by plasma directed toward the area.

9. The method of claim 1 wherein the energy pulse is provided by a flame directed toward the area.

10. The method of claim 1 wherein the energy pulse has a power density in the range of 50–150 megawatts/cm$^2$.

11. A metal lift tab for use as a lifting tab in a data storage hard drive having a surface smoothed according to the method of claim 1.

12. A lift tab for use in a data storage hard drive having a load/unload ramp, comprising:

a) a surface for contacting the load/unload ramp; and b) a melted and refrozen spot on the surface, wherein the melted and refrozen spot is surrounded by ripples.

13. The lift tab of claim 12 wherein the lift tab surface is curved.

14. The lift tab of claim 12 wherein the melted and refrozen spot has a depth in the range of 0.2 to 10 microns.

15. The lift tab of claim 12 wherein the melted and refrozen spot has a depth in the range of 1 to 3 microns.

16. The lift tab of claim 12 wherein the lift tab is made of stainless steel.

17. A head gimbal assembly for use in a load/unload type of data storage hard drive having a load/unload ramp, comprising:

a) a mounting section for attachment to a rotary actuator;

b) a rigid arm attached to the mounting section;

c) a flexible suspension attached to the rigid arm;

d) a lift tab attached to the flexible suspension, wherein the lift tab comprises:

1) a curved surface for contacting the load/unload ramp; and 2) a melted and refrozen spot on the curved surface, wherein the melted and refrozen spot is surrounded by ripples.

18. The lift tab of claim 17 wherein the melted and refrozen spot has a depth in the range of 0.2 to 10 microns.

19. The lift tab of claim 17 wherein the melted and refrozen spot has a depth in the range of 1 to 3 microns.

20. A load/unload type data storage device comprising:

a) a data storage disk;

b) a load/unload ramp disposed near the data storage disk;

c) a head gimbal assembly;

d) a lift tab for contacting the load/unload ramp, wherein the lift tab comprises a melted and refrozen spot surrounded by ripples and located on the lift tab such that the spot contacts the load/unload ramp;

e) a rotary actuator for rotating the head gimbal assembly with respect to the data storage disk such that the lift tab contacts the load/unload ramp.

21. The lift tab of claim 20 wherein the melted and refrozen spot has a depth in the range of 0.2 to 10 microns.

22. The lift tab of claim 20 wherein the melted and refrozen spot has a depth in the range of 1 to 3 microns.

23. The data storage device of claim 20 wherein the load/unload ramp is made of polymer material.

24. The data storage device of claim 20 wherein the lift tab is made of stainless steel.

* * * * *